(12) United States Patent
Ferrell

(10) Patent No.: US 7,943,189 B2
(45) Date of Patent: May 17, 2011

(54) FOOD PRESERVATION PACKAGING SYSTEM

(76) Inventor: Lee Ferrell, Richmond, IN (US)

( * ) Notice: Subject to any disclaimer, the term of this patent is extended or adjusted under 35 U.S.C. 154(b) by 847 days.

(21) Appl. No.: 11/924,939

(22) Filed: Oct. 26, 2007

(65) Prior Publication Data

US 2010/0233328 A1    Sep. 16, 2010

(51) Int. Cl.
*B65D 81/26* (2006.01)
(52) U.S. Cl. .......... 426/124; 426/384; 428/34.4
(58) Field of Classification Search .......... 426/124, 426/384; 428/34.4, 34.6; 220/212, 359.1, 220/359.3, 359.4, 359.5
See application file for complete search history.

(56) References Cited

U.S. PATENT DOCUMENTS

| | | | |
|---|---|---|---|
| 2,163,996 | A | 6/1939 | Flosdorf |
| 3,210,171 | A | 10/1965 | Macdonald |
| 3,385,715 | A | 5/1968 | Ishler |
| 3,635,510 | A | 1/1972 | Stoller |
| 3,806,610 | A | 4/1974 | Rahman |
| 3,903,312 | A | 9/1975 | Clinton |
| 3,950,560 | A | 4/1976 | Rahman |
| 3,984,577 | A | 10/1976 | Rahman |
| 4,096,283 | A | 6/1978 | Rahman |
| 4,396,655 | A | 8/1983 | Graham |
| H70 | H | 6/1986 | Berkowitz |
| 4,609,102 | A | 9/1986 | Blum |
| 5,105,957 | A | 4/1992 | Mannl |
| 5,304,419 | A | 4/1994 | Shores |
| 5,518,740 | A | 5/1996 | Costanzo |
| 5,551,557 | A | 9/1996 | Brooks |
| 5,723,167 | A | 3/1998 | Lewis |
| 6,341,627 | B1 | 1/2002 | Boyesen |
| 6,635,295 | B1 | 10/2003 | Horigane |
| 6,695,238 | B2 | 2/2004 | Inoki |
| 2005/0019456 | A1 | 1/2005 | Iwasaki |
| 2005/0255206 | A1 | 11/2005 | Fukasawa |

FOREIGN PATENT DOCUMENTS

| | | |
|---|---|---|
| AU | 622225 | 4/1992 |
| EP | 1072199 | 10/2001 |
| EP | 1737494 | 1/2007 |
| GB | 1213929 | 11/1970 |
| GR | 3017371 T | 12/1995 |
| JP | 63042664 | 2/1988 |
| JP | 4229161 | 8/1992 |
| JP | 9285378 | 11/1997 |

*Primary Examiner* — Rena L Dye
*Assistant Examiner* — Chaim Smith
(74) *Attorney, Agent, or Firm* — C. John Brannon; Brannon Sowers Hughel PC

(57) ABSTRACT

A system for preserving food, including a substantially anhydrous food mass, a substantially vitreous layer surrounding the substantially anhydrous food mass and defining an enclosure, and a partial vacuum formed within the enclosure. The substantially anhydrous food mass is typically a freeze-dried and compacted body, and the enclosure is typically defined by a contiguous glass shell, more typically a non-porous glass shell, enveloping the food mass.

13 Claims, 5 Drawing Sheets

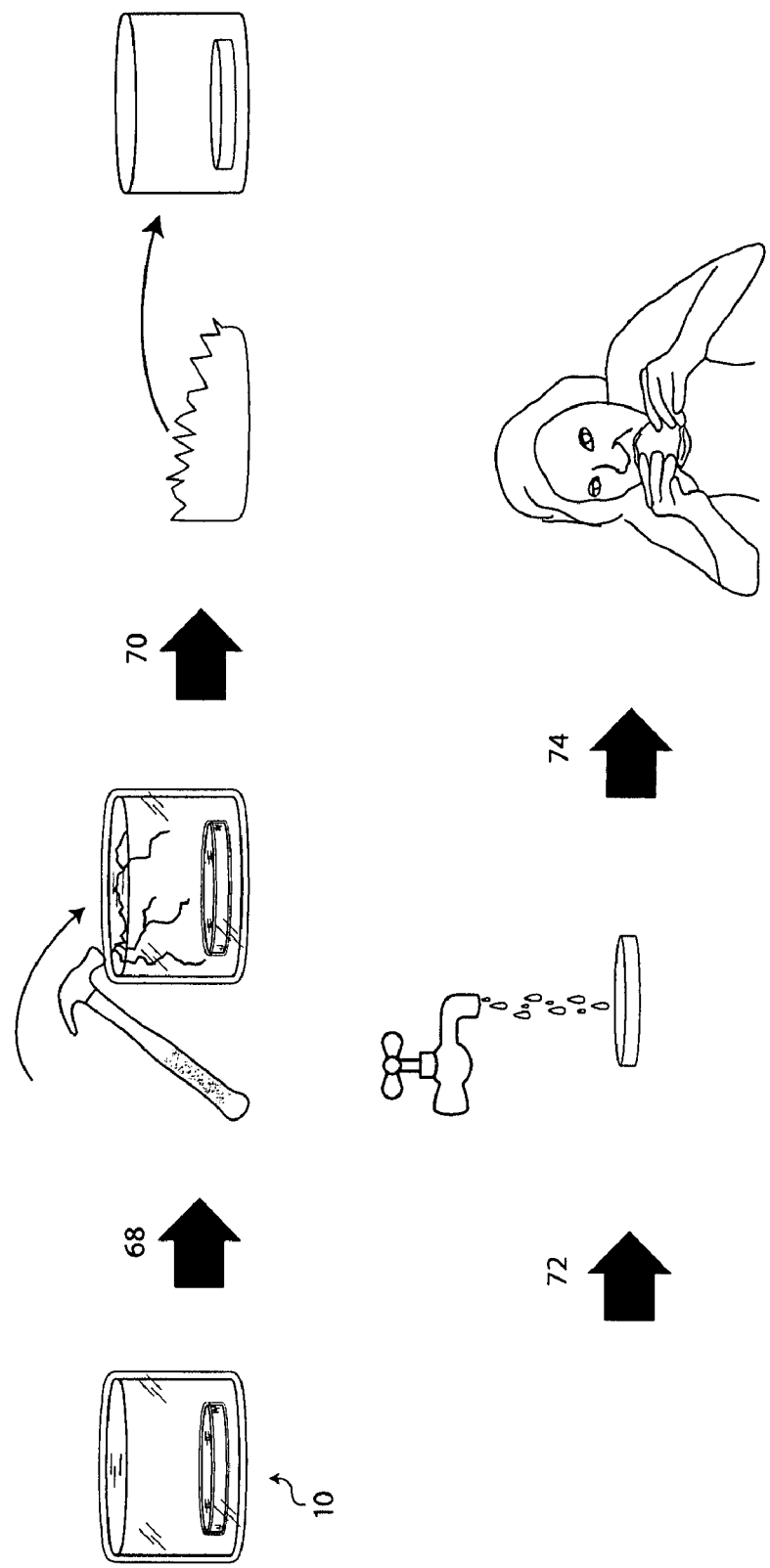

# FOOD PRESERVATION PACKAGING SYSTEM

TECHNICAL FIELD

The novel technology relates generally to the field of food packaging, and, more particularly, to a method and system whereby food to be preserved is first freeze-dried and compressed, and then sealed in a low-oxygen environment in a glass container.

BACKGROUND

Freeze drying or lyophilization is a well-known technique for preserving foods for storage at ambient temperatures for extended periods of time, provided the dried foods are maintained at very low moisture levels during storage. When properly prepared and stored, such freeze-dried foods may be rehydrated when desired for consumption. Depending on the freeze-drying technique employed and how well the foods were stored, the reconstituted foods may be of quality approximating that of freshly prepared foods, or may be of significantly lower quality (i.e., the reconstituted foods may be mushy, rubbery, or otherwise unappealing).

In recent years, the armed forces have found compact freeze-dried foods desirable as meals ready to eat (MREs), as they are both space and weight efficient for storage on vehicles (particularly submarines and aircraft) and are easy for the average infantryman to carry. Further, compact and light freeze-dried foods are attractive for long term storage in emergency safety facilities and as emergency meals for sudden deployment to disaster victims. The freeze-drying process typically involves substantially removing the water from the food products by freezing them and then reducing the surrounding air pressure while adding sufficient heat to allow the frozen water to sublime directly from solid to gaseous phase. There are typically three stages in the freeze-drying process. First, the material to be dried is frozen to a temperature below that of the formation of water ice, and, more typically, to below the eutectic point of water (the lowest temperature where solid water ice and liquid water can coexist). This ensures that sublimation rather than melting will occur during the subsequent water removal steps. During the next phase the pressure is lowered and enough heat is supplied to the frozen food for the frozen water to sublimate. In this step, most of the water is removed via sublimation. Often, sublimation occurs under a partial vacuum to speed the drying process. Finally, a secondary drying step is often employed to remove adsorbed water accumulated during the preceding steps. In this phase, the temperature is raised even higher than in the primary drying phase to break any physico-chemical interactions that have formed between the water molecules and the frozen food. Typically, the pressure is also lowered in this stage to encourage sublimation, but the pressure may be elevated as well. After the freeze drying process is complete, the vacuum is usually broken with an inert gas, such as nitrogen, before the material is sealed.

If a freeze-dried food is adequately sealed to prevent the reintroduction of moisture, the freeze-dried food may be stored indefinitely at room temperature without spoilage. Such storage is possible because the low moisture content inhibits the action of bacteria and enzymes that would otherwise act to spoil or degrade the substance.

The freeze-drying process does not result in significant shrinkage of the freeze-dried foods. Thus, once freeze-dried, the food may be compressed or compacted for more efficient storage. One commonly employed method of compacting freeze-dried foods involves, after freeze-drying, spraying the food with sufficient water to raise its average moisture content to between about 5 and about 13% and then compressing the dried food. The moisture level is increased to make the food more plastic to allow the food to flow instead of shatter during compaction and to allow the food to retain its cellular structure. However, to assure adequate and homogeneous plasticization of the freeze-dried food, the dried food is sprayed with water (or, more typically, an aqueous solution of a gum or the like) and is then given sufficient time for the water to substantially equilibrate throughout the food. This process of homogenization may take hours or even days to complete. Further, after compaction, the added moisture must once again be removed via a dehydration step if the food is to benefit from the drying process enough to be stored at room temperature, again adding to the time and expense involved.

It is desirable to be able to achieve the freeze-drying and compaction of the food mass without the lengthy rehydration process. However, if the food mass is only partially freeze-dried to an average moisture content of 5 to 13 percent, the moisture distribution is typically uneven, with the exterior of the food mass being almost completely dry and the core being still full of ice to almost it's normal moisture content. In one compaction method, the food mass is partially freeze-dried and then microwave heated to assist in melting the core to more rapidly remove the core water and achieve the level of hydration commensurate with the plasticity of the food mass for compaction. The food is then compacted and then dried sufficiently for storage.

In another technique, the food mass is first partially dehydrated, and then freeze dried to moisture content level sufficient for plasticity. The food mass is then compacted, and then freeze-dried for storage.

Once freeze-dried and compacted, the food may be stored for long, extended periods at room temperature. The storage time is limited by the how well the packaging of the food keeps out moisture. Most freeze-dried foods are sealed in plastic or metal containers, and may be so preserved for years or even decades. However, metal and plastic seals are still slightly porous and may degrade over time such that their porosity gradually increases, yielding an upper safe storage limit of about 25-30 years. While this is more than sufficient for most applications, food prepared and stored for use in rare and unusual emergency situations may be required to be stored for 50 to 60 years or even longer. Thus, there remains a need for an improved system for storing freeze-dried foods. The present novel technology addresses this need.

SUMMARY OF THE NOVEL TECHNOLOGY

The present novel technology relates to a method and system whereby food to be preserved is first freeze-dried and then typically, but not necessarily, compressed, and then sealed in a low-oxygen/low-moisture environment in a glass container. One object of the present novel technology is to provide an improved food preservation system. Related objects and advantages of the present novel technology will be apparent from the following description.

BRIEF DESCRIPTION OF THE DRAWINGS

FIG. 5 is a schematic view of a user opening and eating the food mass stored according to one of the embodiments of FIGS. 1-4.

DESCRIPTION OF THE PREFERRED EMBODIMENTS

Figure 1:
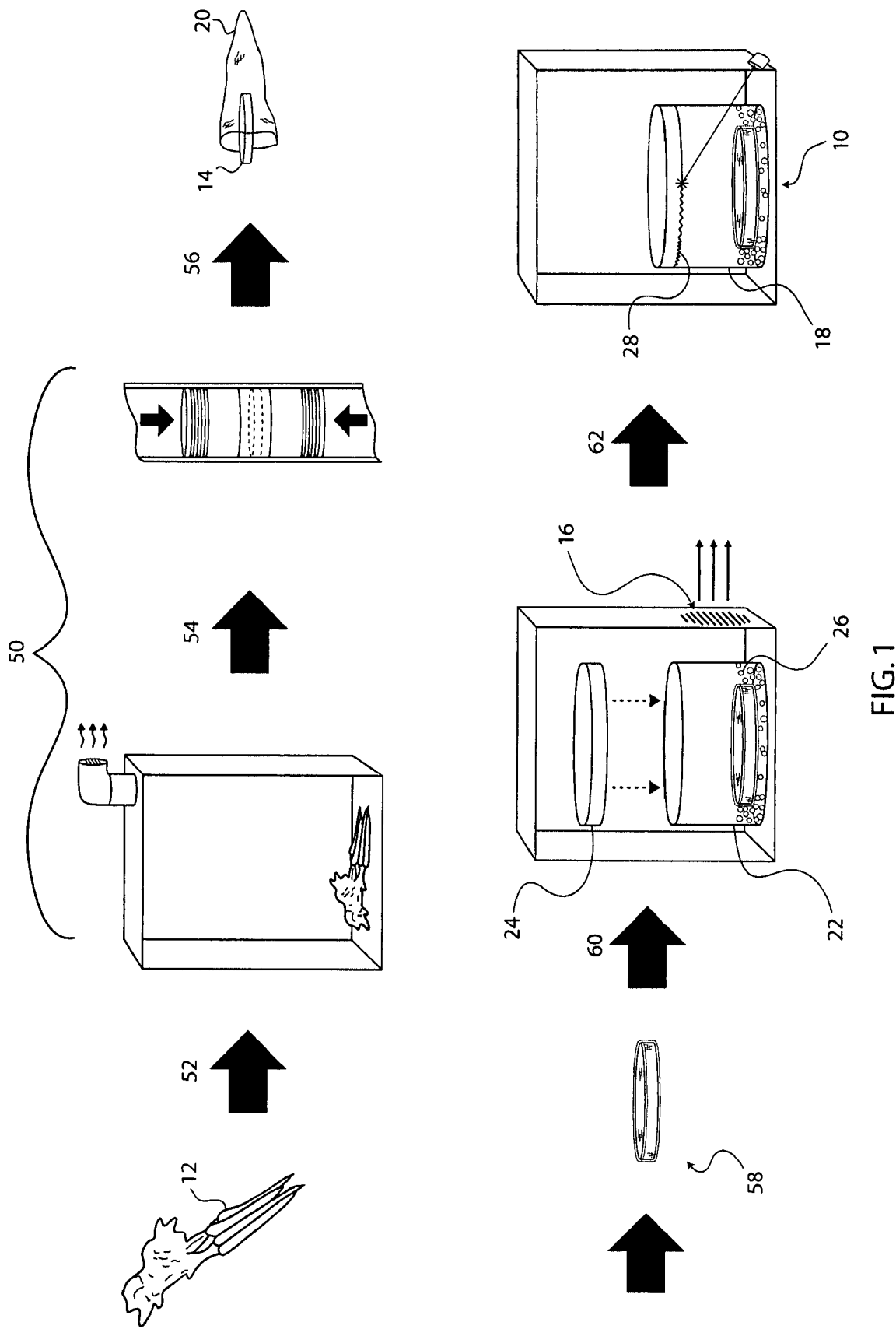
FIG. 1 is a schematic view of a method for freeze drying and compacting a food mass and then sealing the compacted and dried mass in a glass container according to a first embodiment of the present novel technology.
Figure 2:
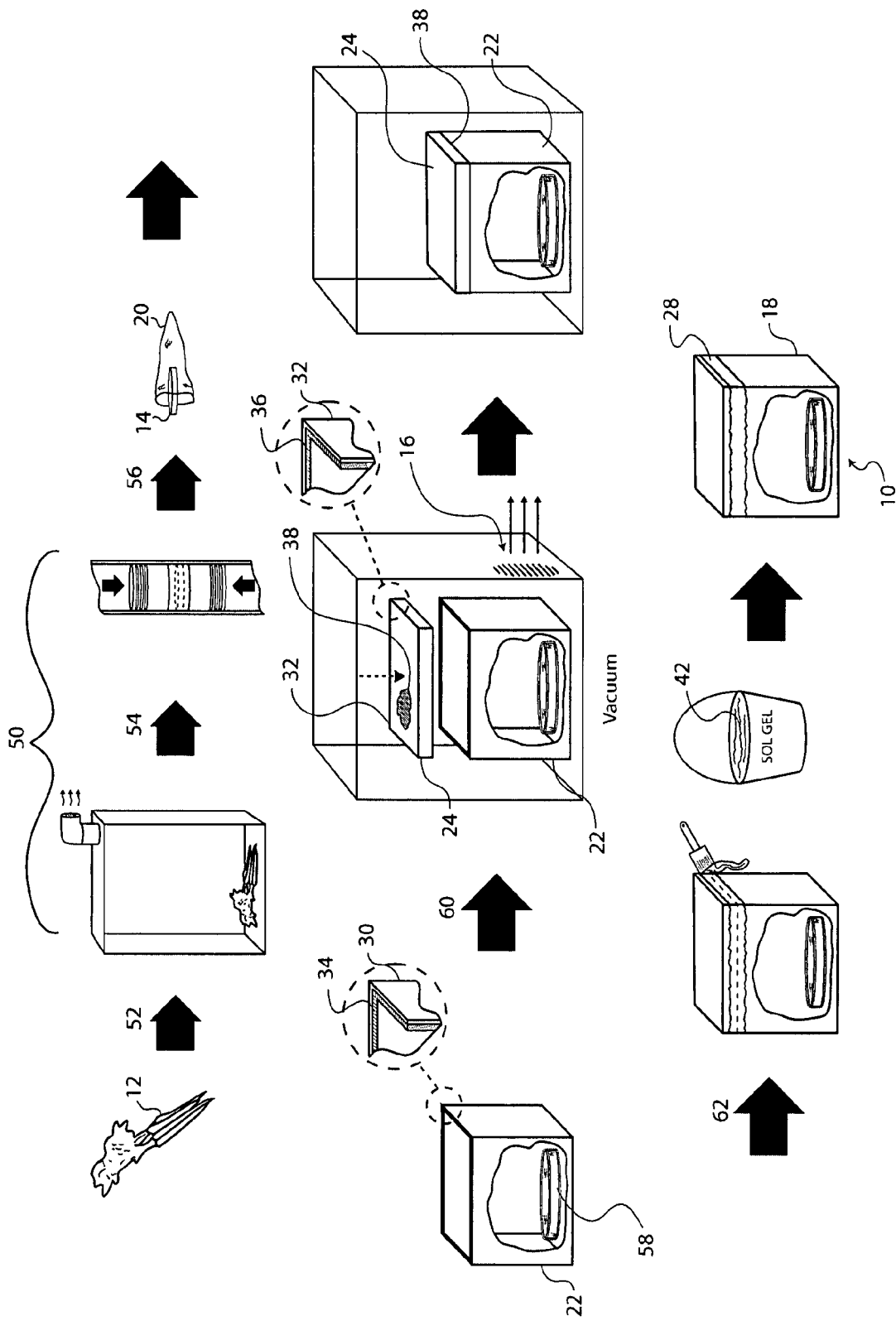
FIG. 2 is a schematic view of a method for freeze drying and compacting a food mass and then sealing the compacted and dried mass in a glass container according to a second embodiment of the present novel technology.
Figure 3:
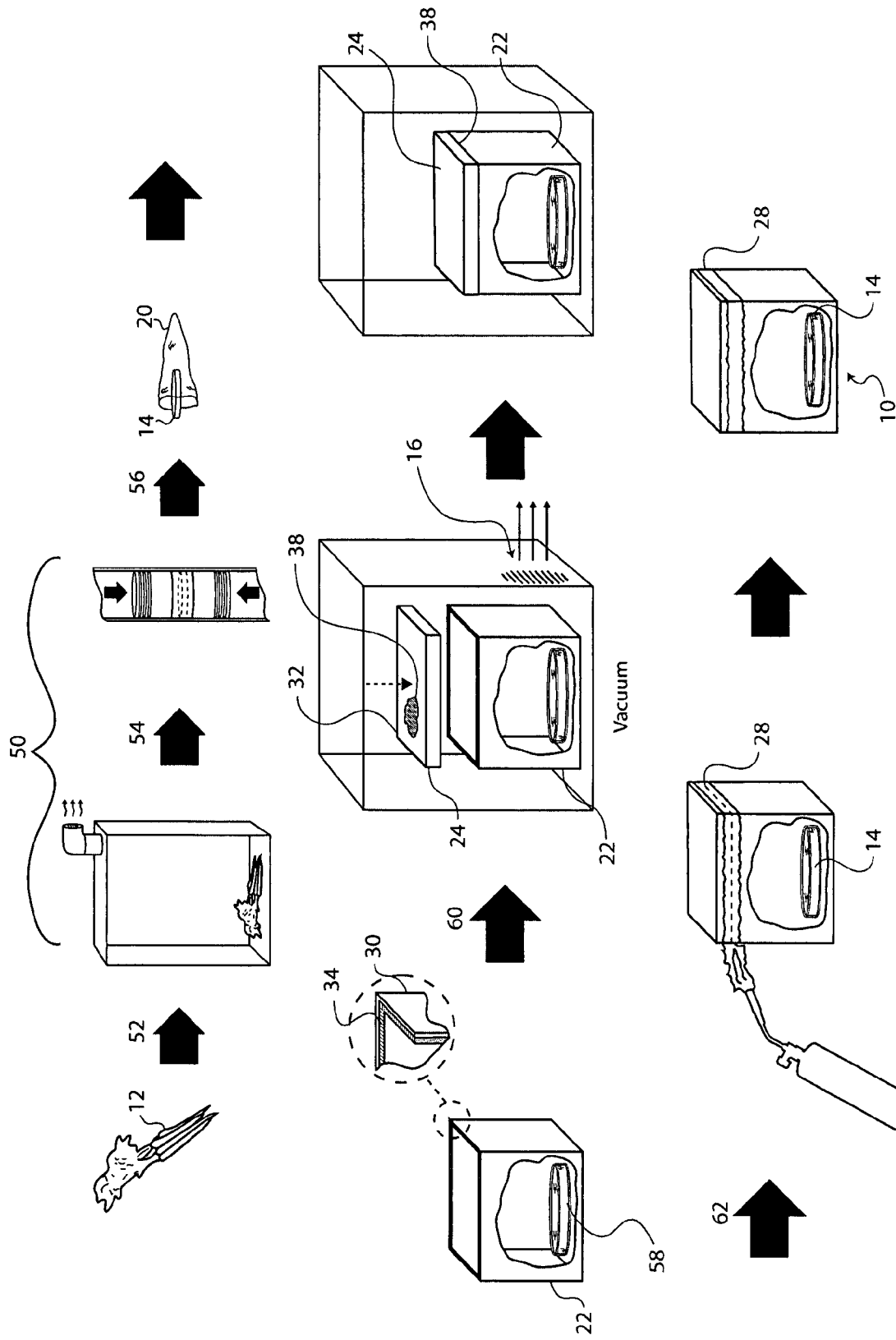
FIG. 3 is a schematic view of a method for freeze drying and compacting a food mass and then sealing the compacted and dried mass in a glass container according to a third embodiment of the present novel technology.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

FIGS. 1-4 illustrate a first embodiment of the present novel technology, a system 10 for preserving the integrity of dried goods, typically foods 12 that have been freeze-dried and, more typically, compacted for long term storage. The system 10 includes a dried and compacted food mass 14 that has been enveloped in a partial vacuum 16 formed inside a glass container 18. More typically, the dried and compacted food mass 18 is wrapped in a protective sleeve 20, such as a plastic film or the like, prior to positioning within the glass container 18. The glass container 18 includes a central portion 22 and a lid portion 24 sealedly connected thereto to define a substantially contiguous vitreous or glassy enclosure 18, such as via laser or torch fusion (wherein a laser, torch or like device is used to sufficiently heat the intersection of the lid and central portions 24, 22 such that they flow together to form, when cooled, a contiguous vitreous enclosure 18). (See FIGS. 1 and 3, respectively). Typically, water absorbing agents or desiccants 26 are placed in the enclosure 18 to further assure a substantially anhydrous environment therein.

Alternately, the glass container 18 may include central and lid portions 22, 24 joined by a vitreous seal 28 formed from a sol-gel precursor; typically, the seal 28 is formed by layering multiple coatings of sol-gel precursor over each other while allowing sufficient time for the previous layer to substantially 'dry' or set up between applications. (See FIG. 2). More typically, the central and lid portions 22, 24 each include a non-vitreous outer portion 30, 32 and a vitreous or glass inner layer liner portion 34, 36. The sol-gel sealant 28 typically adheres to the outer portions 30, 32 at their intersection 38 and penetrates therebetween to also adhere to and form a glass seal between the inner liner portions 34, 36.

Figure 4:
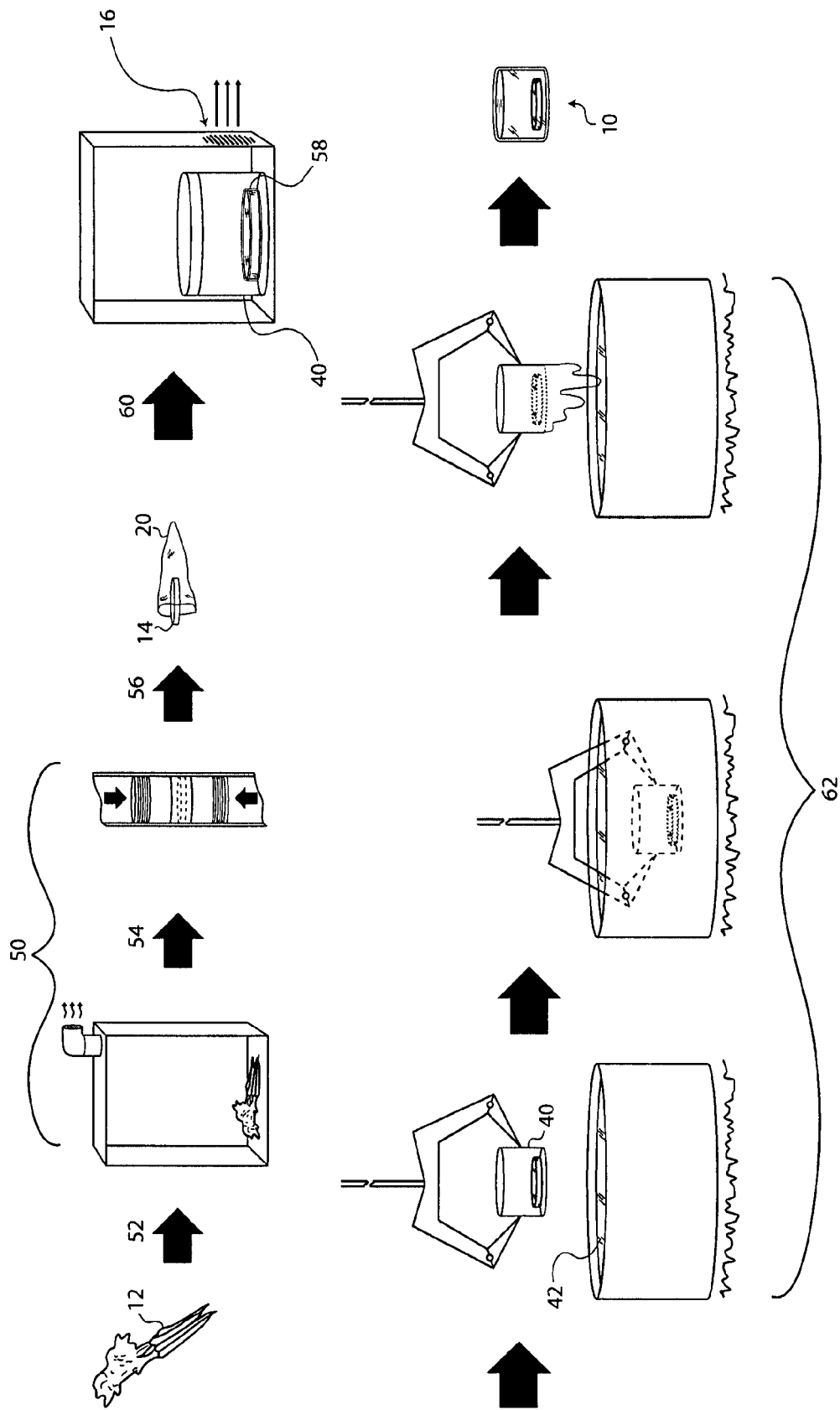
FIG. 4 is a schematic view of a method for freeze drying and compacting a food mass and then sealing the compacted and dried mass in a glass container according to a fourth embodiment of the present novel technology.

Still alternately, a glassy enclosure 18 may be formed around an intermediate container 40 enclosing the partial vacuum 16 and compacted, freeze-dried food mass 14, such as by dipping the intermediate container in a glass source 42, which may be a glass melt, a sol-gel precursor, or the like (see FIG. 4).

In operation, a long life freeze-dried food product 10 is generated by first preparing a compacted and freeze-dried food mass 50; the freeze-drying and compaction processes 52, 54 may be performed sequentially or simultaneously. Typically, the dried and compacted food mass 14 is then wrapped or enveloped 56 into a protective sleeve 20, although this is not necessary and may be omitted. The wrapped (or unwrapped) food product 58 is enveloped 60 by a partial vacuum 16 and positioned in the enclosure 18. The enclosure 18 is then sealed 62 to maintain the vacuum and desiccated environment therein.

The glass enclosure 18 may be formed from the joining of glass central and lid portions of a glass container 18 (see FIGS. 1 and 3), the joining of inner glass linings 32, 36 of the central and lid portions 30, 34 making up the container 18 (see FIG. 2) or as a unitary coating formed over an inner vitreous or non-vitreous container (see FIG. 4), such as by sol-gel or glass melt coating.

When desired, the system 10 may be utilized by breaking 68 the glass seal 28 and/or enclosure 18, removing 70 the compacted and dehydrated food mass 14 from the vacuum 16 and enclosure 18, rehydrating 72 the compacted and dehydrated food mass 14, and then eating 74 the rehydrated, reconstituted food (see FIG. 5).

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A container in which food is stored, comprising:
   a compressed, freeze-dried food mass;
   a partial vacuum wherein the glass enclosure comprises a central glass portion and a glass lid portion wherein the glass lid portion is fused to the glass central portion surrounding the food mass; and
   a glass enclosure defining the partial vacuum.

2. The container of claim 1 and further comprising a plastic sleeve substantially surrounding the food mass.

3. The glass container of claim 1 wherein the lid portion is laser-fused to the central glass portion.

4. The container of claim 1 wherein the glass enclosure further comprises a central glass portion and a glass lid portion connected thereto and wherein the glass lid portion was substantially glass-sealed to the central glass portion.

5. The container of claim 4 wherein the glass-seal is applied as a sol-gel coating.

6. The container of claim 1 and further comprising a water absorbing agent positioned within the glass enclosure.

7. The container of claim 4 wherein the central portion further comprises a first non-vitreous enclosure portion defining an inner enclosure surface and a first glass lining portion formed on the inner surface; wherein the first glass lining portion covers the inner enclosure surface; wherein the lid portion further comprises a first non-vitreous lid portion defining an inner lid surface and a second glass lining portion formed on the inner lid surface; and wherein the second glass lining portion covers the inner lid surface.

8. The container of claim 7 wherein the glass-seal is applied as a sol-gel coating.

9. The container of claim 1 further comprising an inner non-vitreous container disposed between the compressed, freeze-dried food mass and the glass enclosure and wherein the glass enclosure is formed around the inner non-vitreous container.

10. The container of claim 9 wherein the glass enclosure is formed from sol-gel precursor.

11. A container in which food is preserved, comprising:
a substantially anhydrous food mass;
a vitreous layer surrounding the substantially anhydrous food mass and defining an enclosure; and
a partial vacuum formed within the enclosure.

12. The container of claim 11 wherein the substantially anhydrous food mass is freeze-dried and compacted.

13. The container of claim 11 wherein the enclosure is defined by a contiguous glass shell enveloping the food mass and wherein the glass shell is substantially non-porous.

* * * * *